(12) United States Patent
Erbey

(10) Patent No.: US 6,476,850 B1
(45) Date of Patent: Nov. 5, 2002

(54) APPARATUS FOR THE GENERATION OF A STEREOSCOPIC DISPLAY

(76) Inventor: Kenneth Erbey, P.O. Box 2892, Palmer, AK (US) 99645

( * ) Notice: Subject to any disclaimer, the term of this patent is extended or adjusted under 35 U.S.C. 154(b) by 0 days.

(21) Appl. No.: 09/169,094

(22) Filed: Oct. 9, 1998

(51) Int. Cl.7 ............................................... H04N 13/04
(52) U.S. Cl. ............................ 348/51; 348/43; 348/56; 348/39; 348/59; 345/6
(58) Field of Search .............................. 348/6, 39, 51, 348/54, 56, 57, 58, 59; 382/154

(56) References Cited

U.S. PATENT DOCUMENTS

| | | | | |
|---|---|---|---|---|
| 5,541,642 A | * | 7/1996 | Ashbey | 348/59 |
| 5,870,137 A | * | 2/1999 | Stuetler | 348/51 |
| 5,917,539 A | * | 6/1999 | Sorensen | 348/56 |
| 6,040,852 A | * | 5/2000 | Stuettler | 348/43 |
| 6,191,808 B1 | * | 2/2001 | Katayama | 348/39 |
| 6,327,381 B1 | * | 12/2001 | Rogina | 348/39 |
| 6,329,963 B1 | * | 12/2001 | Chiabrera | 345/6 |

* cited by examiner

Primary Examiner—Chris Kelley
Assistant Examiner—Charles Parsons
(74) Attorney, Agent, or Firm—Michael J. Tavella

(57) ABSTRACT

An apparatus for the generation of a full-spectrum stereoscopic display. The system uses a flat, masking screen comprised of a plurality of regularly spaced, vertical apertures arranged in front of, parallel, and in a geometric relation to a flat, image display screen. The image has two viewpoints (one right-eye and one left-eye) interlaced by alternate vertical rows of pixels. The system creates a full-spectrum stereoscopic display when the image is viewed with proper geometric alignment by a viewer through the vertical apertures of the masking screen, which effectively separates the alternating left-eye/right-eye viewpoint vertical rows of pixels in such a manner as to allow the right eye to only see the right-eye viewpoint and the left eye to only see the left-eye viewpoint. A holographic display can be achieved by using five cameras, which allow a viewer to "see" and image from different angles.

17 Claims, 12 Drawing Sheets

APPARATUS FOR THE GENERATION OF A STEREOSCOPIC DISPLAY

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

The invention relates to an apparatus for displaying a stereoscopic image for use in computer graphics, television, virtual reality, and the like.

2. Description of Related Art

Stereoscopic viewing is a process that tricks the brain into thinking that it is seeing a three-dimensional image. This is accomplished by a viewer having one eye see a slightly different perspective than the other eye. Stereoscopic devices, such as the old Stereoscopes, or the more modern VIEW MASTER(™) utilized this concept. They consisted of two separate photographs—one representing the right eye's viewpoint, and the other the left eye's viewpoint, with the stereoscopic device separating the two. The viewer looks into the device and the right eye sees the right eye viewpoint and the left eye sees the left eye viewpoint, and the brain is tricked into thinking that it is was seeing one three-dimensional image. Although they achieved three-dimensional viewing, these devices suffer from the fact that they can only display still images.

Various methods for displaying moving stereoscopic images have been proposed. One attempt was the ANAGLYPHIC system. Since the brain needs two different viewpoints to achieve a three-dimensional effect, this system blends the two viewpoints into one picture, highlighting one of the viewpoints in blue, and the other viewpoint in red. The viewers of this system are required to wear special glasses. One lens of the glasses is tinted red while the other lens is tinted blue. The theory being that the red lens filters out the red highlighted image allowing the eye to see only the blue image, while the blue lens filters out the blue image allowing only the red image to be seen. This use of chromatic distinctions through color filters eliminates the possibility of displaying a full-spectrum stereoscopic image.

Another attempt to achieve stereoscopic displays was the use of lenticular screens. In this method, two viewpoints (one right-eye and one left-eye) are interlaced by narrow vertical strips from each viewpoint into one image. A lenticular screen is positioned in front of the image with the lenticules having the property of separating the right-eye viewpoint from the left-eye viewpoint and presenting each viewpoint to each appropriate eye, creating a somewhat low quality stereoscopic display.

U.S. Pat. No. 2,209,747 (Eisler) discloses a similar system, but instead of a lenticular screen a screen made of a plurality of very narrow vertical slits is placed in front of an image that has been interlaced similar to that of a lenticular method. When a viewer, the slits, and the image are properly positioned, a stereoscopic display is achieved, because the slits allow the viewer's right-eye to view only the right-eye viewpoint and the left-eye to view only the left-eye viewpoint. This method is known as the HESS system of displaying a stereoscopic image. Since the slits have to be very narrow, and since each eye is really only being presented with half of a picture (every other adjacent vertical strip of the entire picture), such a system suffers from a loss of resolution.

Another attempt to create stereoscopic three-dimensional viewing uses polarized glasses. One eye of the viewer's glasses is given polarized characteristics 180 degrees out of phase with the other eye. One field or frame of the display is shown with one eye's polarized characteristics, preventing the other eye from viewing the image. The succeeding field or frame reverses the polarized characteristics allowing the second eye only to view its viewpoint. Early systems used a regular television set with a special screen. The top half of the screen is polarized 180 degrees out of phase with the bottom half. One of the necessary two viewpoints for three-dimensional viewing is displayed on the top half of the screen, while the second viewpoint is simultaneously broadcast on the bottom half. When the viewer put on the special polarized glasses, one eye saw only the top half, while the other eye saw only the bottom half. Several variations of this method have been demonstrated. The polarized characteristics of the image screen can be switched (passive system) or the lenses of the glasses themselves can do the polarization switching (active system). Systems with an effective frame rate of 15 frames per second have been developed by HONEYWELL, PANASONIC (MATSUSHITA), and MEGATEK. Although polarized optics have lead to several elegant methods for displaying stereoscopic images, they still require the use of individual selection devices (glasses).

Virtual Reality (VR) is an application ripe for stereoscopic display systems, and several of the previously mentioned prior arts have been employed. Headsets featuring glasses with two tiny LCD screens viewed through magnifying lenses have been developed (such as those developed by DISPLAYTECH) to create stereoscopic displays in a method very similar to the old Stereoscopes or VIEW MASTER(™). Each eye is optically prevented from seeing the other eye's screen, thus producing a stereoscopic display. These systems can suffer anything from low-quality, to tiny viewing screens, to sheer bulk for all the components necessary to the system.

BRIEF SUMMARY OF THE INVENTION

It is the object of the present invention to provide an improved apparatus for displaying full spectrum, full-motion, stereoscopic images.

It is a further object of the present invention to provide an apparatus for displaying stereoscopic images without the requirement of using special polarized glasses.

Other objects of the present invention will be apparent from the following description of the invention.

My invention is a stereoscopic display unit that uses a flat surface display screen having individual picture elements (pixels) arranged in a grid pattern across its surface. This display screen can display full spectrum images at a sufficient frame rate to prevent undesirable flicker. The display screen also can display an image composed of a plurality of stereopairs: two viewpoints (one right-eye and one left-eye) interlaced by vertical rows of pixels. By displaying said interlaced image, only one half (every-other vertical line) of each right-eye and one half of each left-eye viewpoint is displayed during each frame. The display screen can display the image during one frame. During the succeeding frame, it displays the complimentary image (the undisplayed vertical rows of pixels from each of the right-eye and left-eye viewpoints). For example, if the first vertical row of pixels (far left row) of the first frame is from the right-eye viewpoint, then the first vertical row of the succeeding complimentary frame is from the left-eye viewpoint. A masking screen comprised of a plurality of regularly spaced, vertical apertures is positioned in front of, parallel to, and in a geometric relation with said display screen. This screen lies between the viewer and the display screen. These apertures (or shutters) are made so that only the even numbered shutters are open during one frame, and only the odd numbered shutters are open during the succeeding frame.

When a viewer is positioned so that the open shutter permits the right eye to see only the vertical row of pixels of the interlaced image displaying the right eye viewpoint, while allowing the left eye to see only the left eye viewpoint row, a stereoscopic image of low (one-half) resolution is displayed. During each succeeding frame, the open shutters close, the closed shutters open, and the complementary interlaced image is likewise displayed. When this process is repeated, two high resolution, full spectrum viewpoint images are presented, one to each of the appropriate eyes of the viewer, thus creating a full motion, high resolution, full spectrum stereoscopic display. The masking screen can adjust the parallel distance between the display surface and the masking screen to accommodate the necessary geometric relationship between the display surface, the masking screen, and the viewer(s). Finally, the shutters are constructed such that all shutters can be switched to the open state if the stereoscopic effect is not desired.

DETAILED DESCRIPTION OF THE INVENTION

Figure 1:
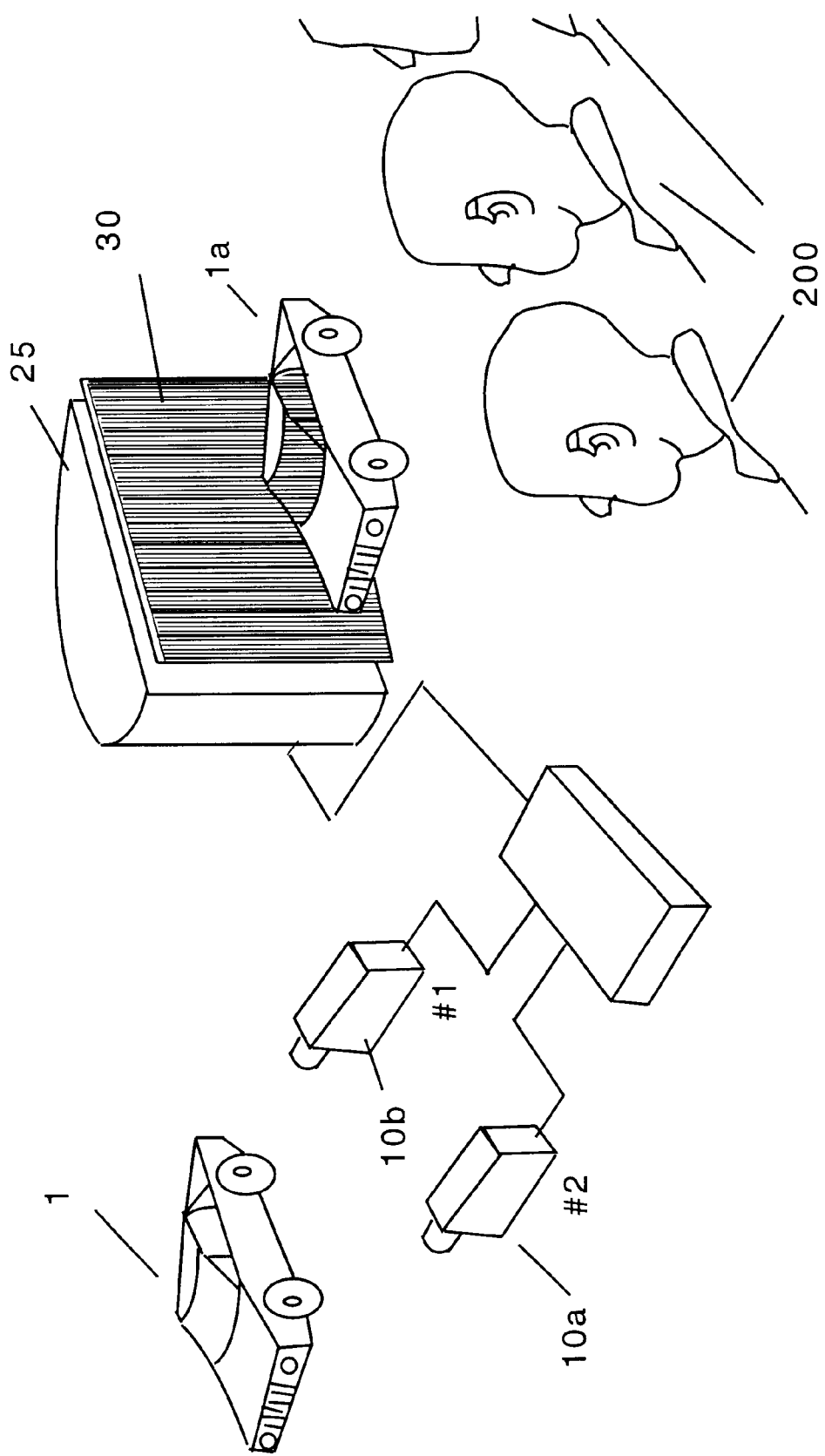
FIG. 1 is a drawing of the overall device, incorporating a two-viewpoint "Static" stereoscopic system, video circuitry, video display, and shutter screen.
Figure 2:
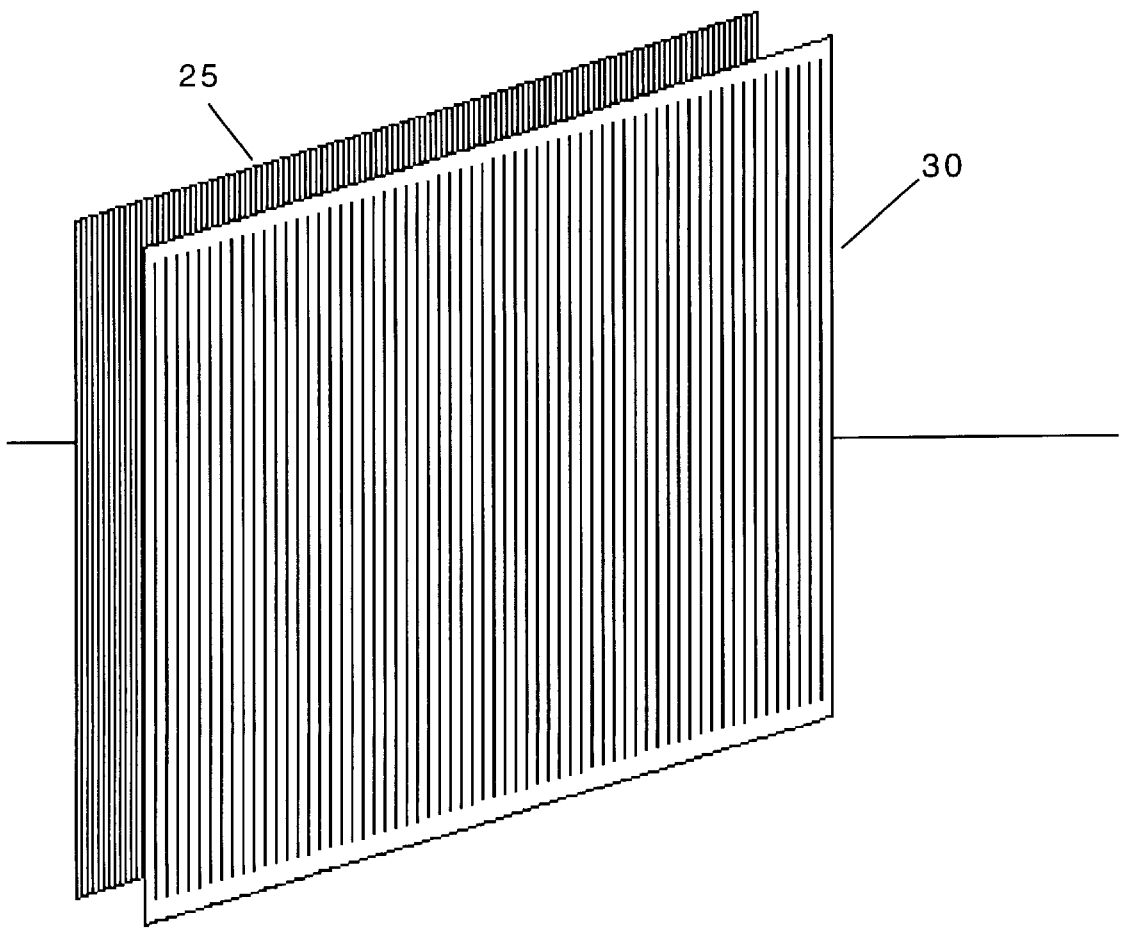
FIG. 2 is a perspective drawing of a stereoscopic display unit of this invention, comprised of a video display and shutter screen.
Figure 3:
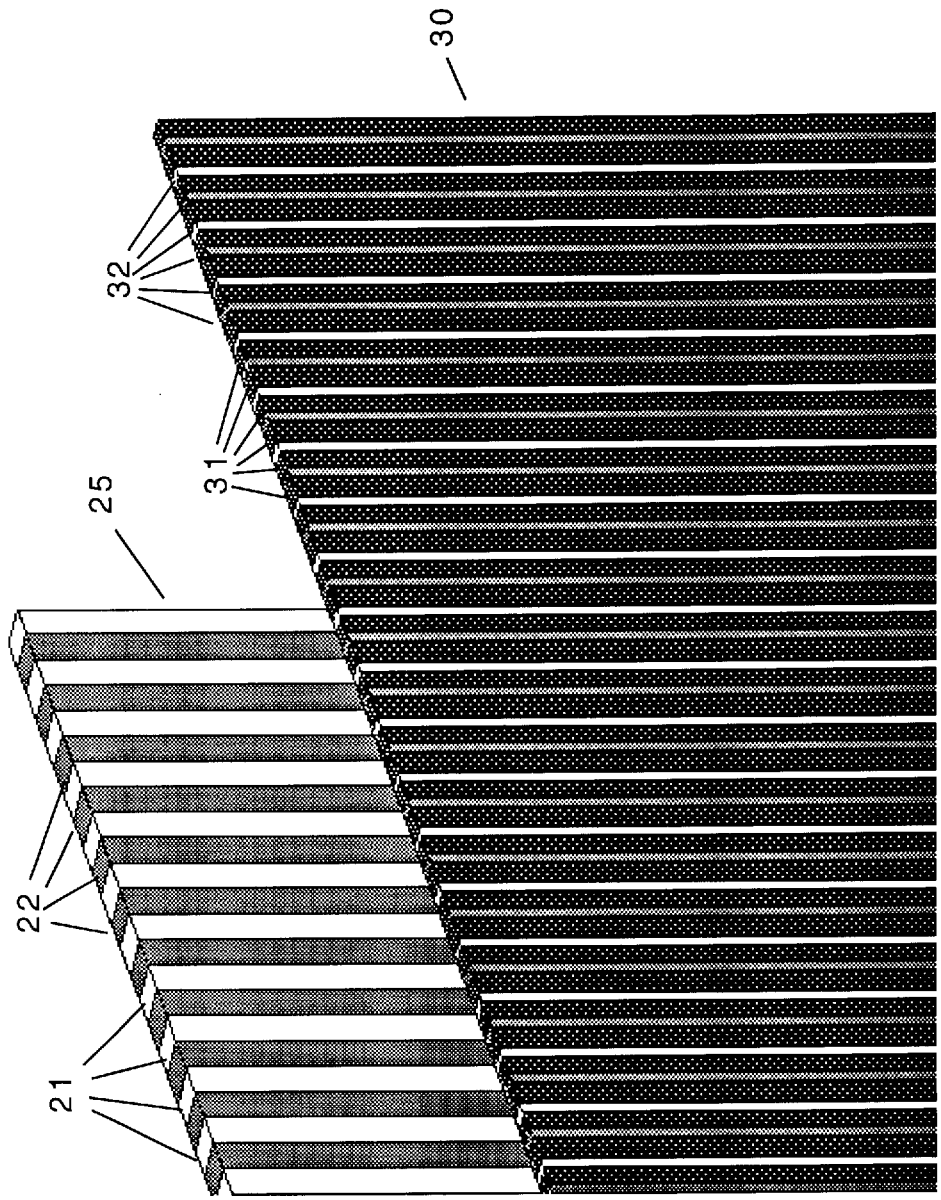
FIG. 3 is an expanded view of the display unit of FIG. 2, showing a two-viewpoint system, comprised of a video display, interlacing the right-eye and left-eye viewpoints, located behind and parallel to, a shutter screen comprised of a plurality of narrow, vertical shutters grouped into two subgroups—one subgroup of shutters "opened", while the second subgroup is closed.

Referring to FIG. 1, there is shown a system for creating and displaying three dimensional stereoscopic images. An image 1 is recorded by two horizontally spaced cameras 10a and 10b, which produces a left eye viewpoint image 2 and right eye viewpoint image 3. The two viewpoint images may be also computer generated. How the images are recorded is incidental to this invention. Once the two images are created, video circuitry 20, common to the art, then creates two successive, complimentary frames by interlacing the two images by columns of pixels. A pixel is commonly defined as the smallest image-forming unit of a video display. In the preferred embodiment, these columns of pixels are one single pixel width wide. Thus, interlaced frame A starts with the far left column of pixels 21 and displays the far left column of pixels taken from the from the left eye viewpoint image. This is then followed by the second column of pixels 22, which presents the second column of pixels from the right eye viewpoint. See, e.g., FIGS. 2 and 3. Each column of pixels is followed in turn by its alternate, e.g., the third column of pixels gives the left eye viewpoint. These pixels are displayed on a display screen 25. The pixel pattern repeats itself across the width of the display screen. Thus, as shown in FIGS. 2 and 3, interlaced frame B is the compliment of frame A That is, the odd numbered columns of pixels display the right eye viewpoint and the even numbered columns of pixels display the left eye viewpoint. See also FIG. 11, which shows the layout of the interlaced images for a typical frame 1 and frame 2.

A masking screen 30 that has a number of vertical apertures is placed between the viewer and the display screen. The vertical apertures are divided into odd 31 and even 32 numbered apertures. While frame A is displayed on the display screen, the even numbered apertures 32 of the masking screen are open, and the odd numbered apertures 31 are closed. The apertures have the effect of masking the interlaced frames in such a manner as to allow the left eye of the viewer to view only those columns of pixels displaying the left eye viewpoint, and the right eye to view only the right eye viewpoint columns of pixels. During the display of the complimentary frame B, the even numbered apertures 32 close and the odd numbered apertures 31 open. At this point, each of the viewer's eyes views the complimentary column of pixels of the display screen that were masked during the previous frame A, thus producing a high resolution three-dimensional stereoscopic display.

As shown in FIG. 2, one type of masking screen 30 is shown. This masking screen 30 is a flat masking screen that is placed in front of, and parallel to, the image display screen. In the preferred embodiment, the display screen is comprised of pixels with as high a horizontal fill-factor as possible (as opposed to pixels utilizing a triad configuration), arranged in a two-dimensional array such as is well known in the art of flat-screen displays.

The masking screen 30 is comprised of a number of parallel, vertical apertures. In the preferred embodiment, these apertures are light transmissive liquid crystal shutters that have power supply and switching circuitry that are typical in the art. Of course, the apertures may also be mechanical. However, mechanical shutters are not preferred because of the additional hardware associated with them and the practical limitations on the mechanical shutter's speed.

Figure 4:
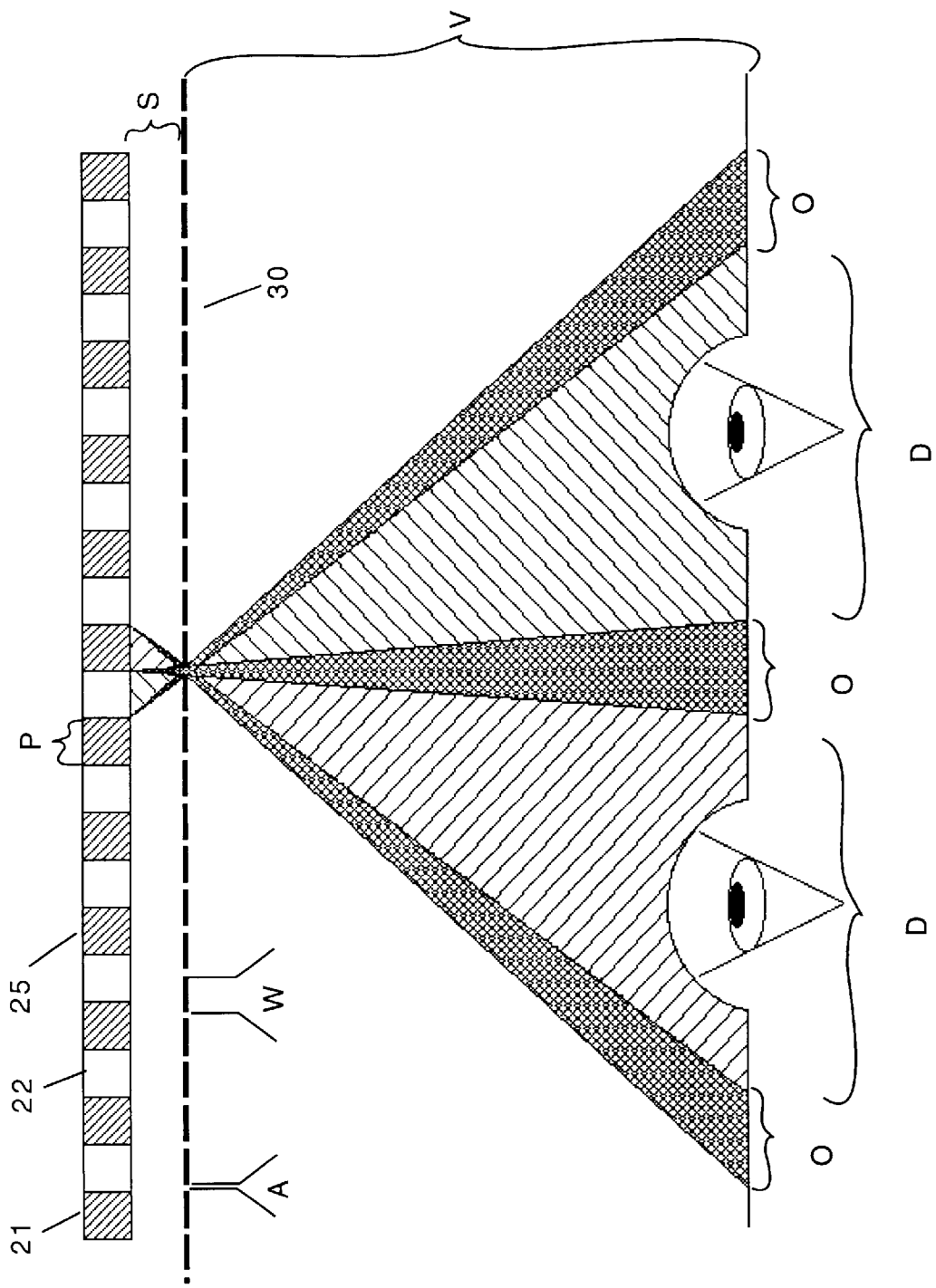
FIG. 4 illustrates the geometric and optical characteristics of the invention, showing the Right Eye viewpoint area, the Left Eye viewpoint area, and the Overlap area, when viewing the top of the display unit of FIG. 2.

FIG. 4 shows the geometric relationship between the flat display screen, the flat masking screen, and the left and right eyes of the viewer. As shown in FIG. 4, when properly aligned, the masking screen creates ideal viewing areas for the right eye and left eye. This figure also shows undesirable areas of overlapping, where it is possible for one eye to view both right and left viewpoint images at the same time. FIG. 4, also shows that while viewing the display screen through the masking screen, each eye is presented with only one-half the total resolution of the image being produced on the display screen (e.g., every other vertical row of pixels) during each frame being displayed. Thus, two low-resolution images are presented (one to each eye) during each frame. To present each eye with the remaining (complimentary) half of the total high resolution image, one set of apertures must close and the adjoining set of apertures must open. The adjoining set of apertures must be located midpoint between the previously opened first set of apertures. This has the effect of allowing the viewer's right eye to see the vertical row of pixels on the display screen that was just viewed by the viewer's left eye, while simultaneously allowing the left eye to view the vertical row of pixels just viewed by the right eye during the previous frame. If a complimentary frame to the previous frame is displayed and viewed through the masking screen with the second set of apertures opened, each eye is presented, over the course of two successive frames, with a high resolution viewpoint image. As a result, the viewer sees a high resolution, three-dimensional stereoscopic image.

The mathematical expressions for these relations are as follows. For a display screen with a width of 11 inches, and having 320 pixels (P) across its width produces a pixel of 0.034375 inches (11/320). The viewer's distance from the screens (V) can be selected next. For this example, V is set at 8.5 inches. The desired viewing area (D) is set at 2.0 inches. The last parameter to be set is the overlap area (O). For this example, O is 0.75 inches. From these parameters, the following parameters can be derived. The first is the aperture width (A). The second is the opaque width (W). The last is the screen distance (S). These are derived from the following equations:

$$A=(P*O)/(P+D+O) \quad (1)$$

$$W=(P*D)/(P+D+O) \quad (2)$$

$$S=(P*V)/(P+D+O) \quad (3)$$

For the example described above, A=0.00925 inches, W=0.0247 inches, and S=0.105 inches.

The parameters P, O, D, and V can be any reasonable values. However, the sum of O and D (O+D) cannot be larger than the average distance between a person's right and left eyes (approximately 2.75 inches). From equation (3), it is also clear that only the distance of the masking screen (S) needs to be changed to adjust the viewer's distance from the screen (V). For example, using the example above, if the viewer's distance (V) is 96 inches from the screen, S increases to 1.185 inches. All other parameters remain the same. As noted above, FIG. 4, shows all of these relationships.

Figure 5:
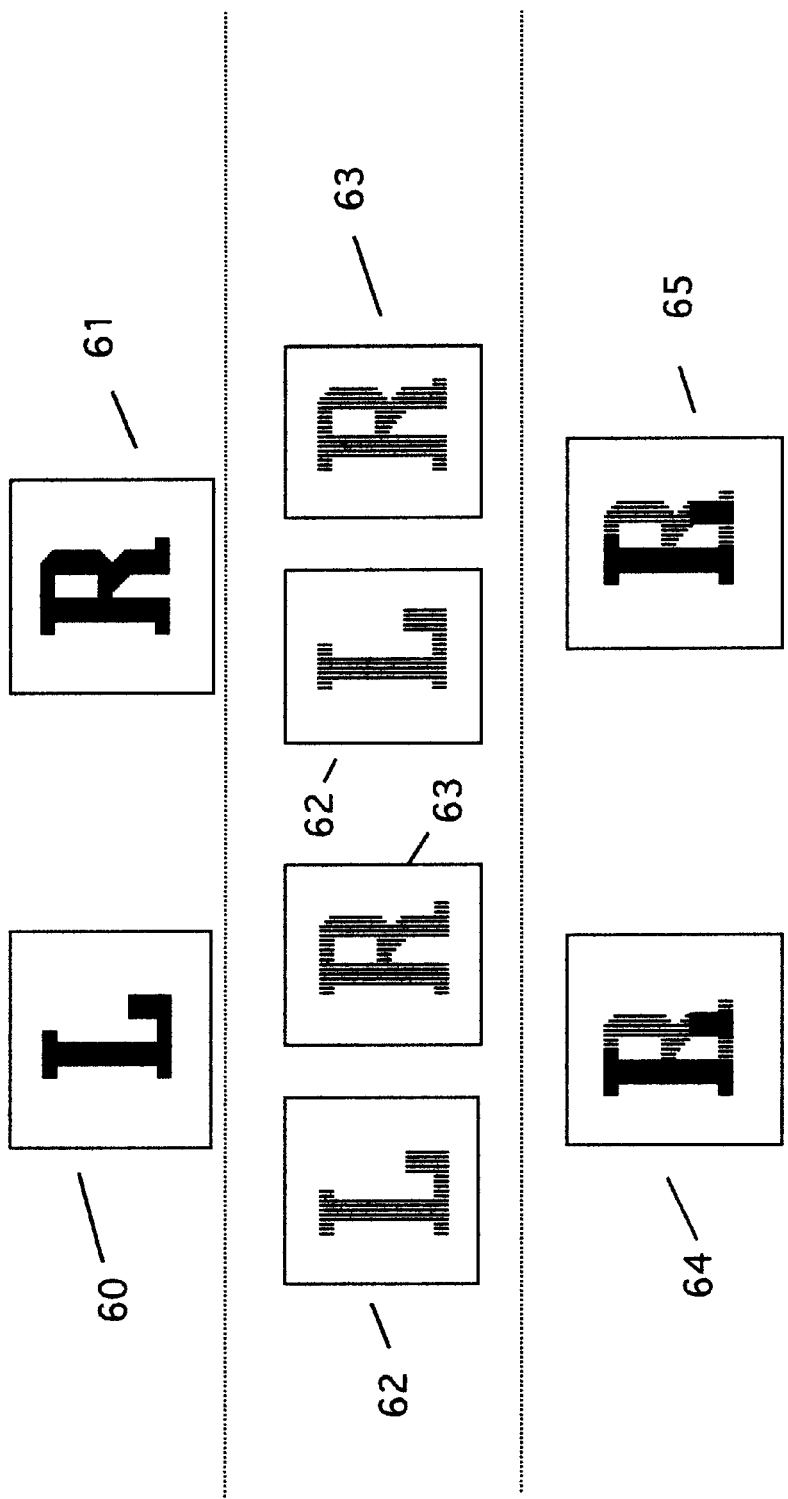
FIG. 5 shows the processing of a stereo pair of images into an interlaced frame and it's succeeding complimentary interlaced frame.

FIG. 5 shows the process for interlacing a right eye viewpoint with a left eye viewpoint to create two complimentary interlaced images. Because it is actually displaying two frames (one to each eye), the preferred embodiment of this invention must be capable of displaying frames at two times the minimum flicker-free frame rate. Also, the fact that the two successive frames are vertically interlaced, helps to alleviate undesired flicker. The top of FIG. 5 shows the two original images 60 and 61. The center portion of the figure shows the original image as divided into the two viewpoint portions, 62 and 63, but which are not yet interlaced. The bottom of the figure shows the two frames as fully interlaced, 64 and 65, ready for display.

Although the masking screen has the desirable effect of masking the appropriate viewpoints from the appropriate eyes of the viewer, it has the undesirable effect of also masking a percentage of the desired vertical row of pixels of the appropriate viewpoint. To overcome any undesirable chromatic distortion, the pixels of the display screen in the preferred embodiment must have a high horizontal fill-factor (i.e., the desired color of the pixel must be displayed for as much of the horizontal width of the pixel as possible). If the construction of each pixel relies on three separate regions to display the three primary colors, the three regions must be arranged vertically as horizontal stripes. Otherwise it is possible to view only two (or even one) of the desired primary colors, thus creating an unacceptable chromatic distortion.

Figure 6:
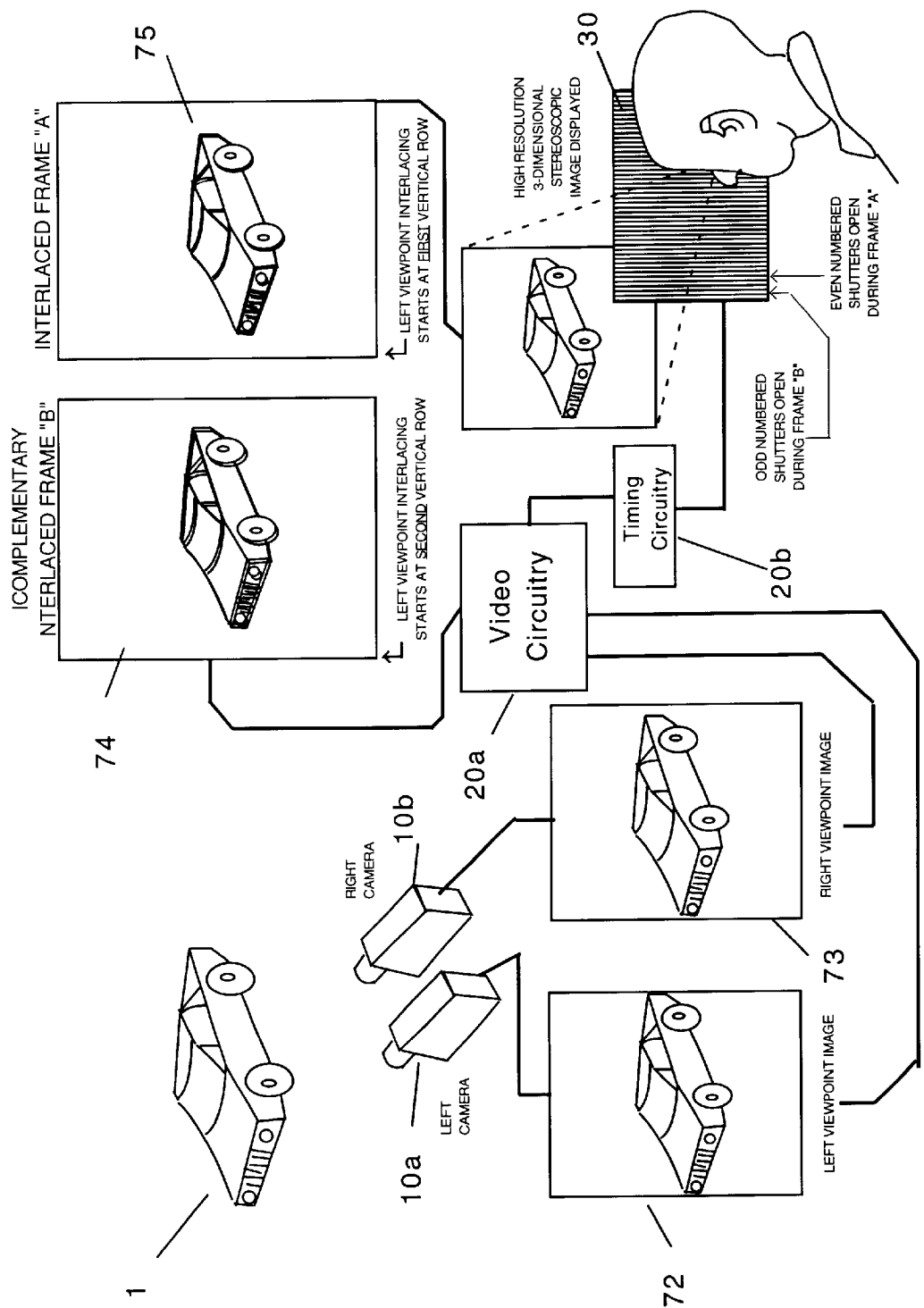
FIG. 6 shows the processing of a stereo pair of images in a manner useful in understanding this invention.

FIG. 6 shows the entire process in a block diagram format. This view is similar to FIG. 1, except that there is more detail shown. Here an image object 1 is caught by two cameras 10*a* and 10*b* as before. These two cameras produce a left viewpoint image 72 and 73, much like the images 62 and 63 shown in FIG. 5. These then move through the video circuits 20*a* to produce the two interlaced frames 74 and 75, that are similar to the frames shown in FIG. 5 as 64 and 65. Note that these images are distorted under normal viewing. As noted on FIG. 6, the complementary interlaced frame "B" 74 has the left viewpoint starting at the second vertical row, while the interlaced frame "A" 75 has the left viewpoint interlacing starting at the first vertical row. Again, this is shown in a schematic form in FIG. 11. These images are projected onto the display screen 25 and are screed by the shutter system 30. A timing circuit 20*b* is used to coordinate the operation of the shutters (as discussed above) with the display of the frames, to produce a stereoscopic image 1*a* as shown in FIG. 1.

Described so far is the preferred embodiment of two viewpoints creating a means for displaying stereoscopic images. Two viewpoints are the minimum number of viewpoints necessary to create a stereoscopic image. Such a two viewpoint system lends itself quite readily to an individual display system such as virtual reality goggles, where the necessary geometric alignment can be easily controlled and maintained.

By increasing the number of viewpoints, as well as a corresponding increase in the number of interlaced frames (one interlaced frame per desired viewpoint), a corresponding increase in the frame rate (the number of desired viewpoints multiplied by the minimum frame rate necessary to eliminate undesirable flicker), as well as a corresponding increase in the number of sub-groups of apertures (one sub-group per desired viewpoint), a holographic display can be achieved (as opposed to the previously described stereoscopic display). A stereoscopic display creates a "static" three-dimensional image. A holographic display creates a three-dimensional image that viewers could actually "look around". In a stereoscopic display, only two viewpoint images are provided—one for the left eye, and one for the right eye. Any lateral movement by the viewer causes the necessary geometric relationship to cease, causing a loss of the three-dimensional properties of the image, or even worse, causing an undesirable inverted three-dimensional image. A holographic display, on the other hand, presents more than two viewpoints. Although any number of viewpoints greater than two successfully creates a holographic display, a display utilizing five viewpoints is used to describe this enhancement here. With five viewpoints, the viewer need only create the proper geometric alignment with any two of the five view points to see the image from a particular angle. At any given time, the viewer can move laterally enough so that each eye then is able to view the adjacent viewpoints presented on the screen. In a stereoscopic display, such lateral movement causes an undesirable "inverted" three-dimensional image. In a five-viewpoint holographic display, for example, such lateral movement creates the sensation of "looking around" the object (provided, of course, that the viewer does not move past the far right or far left viewpoint, in which case the holographic display likewise suffers from an inverted three-dimensional image).

Figure 7:
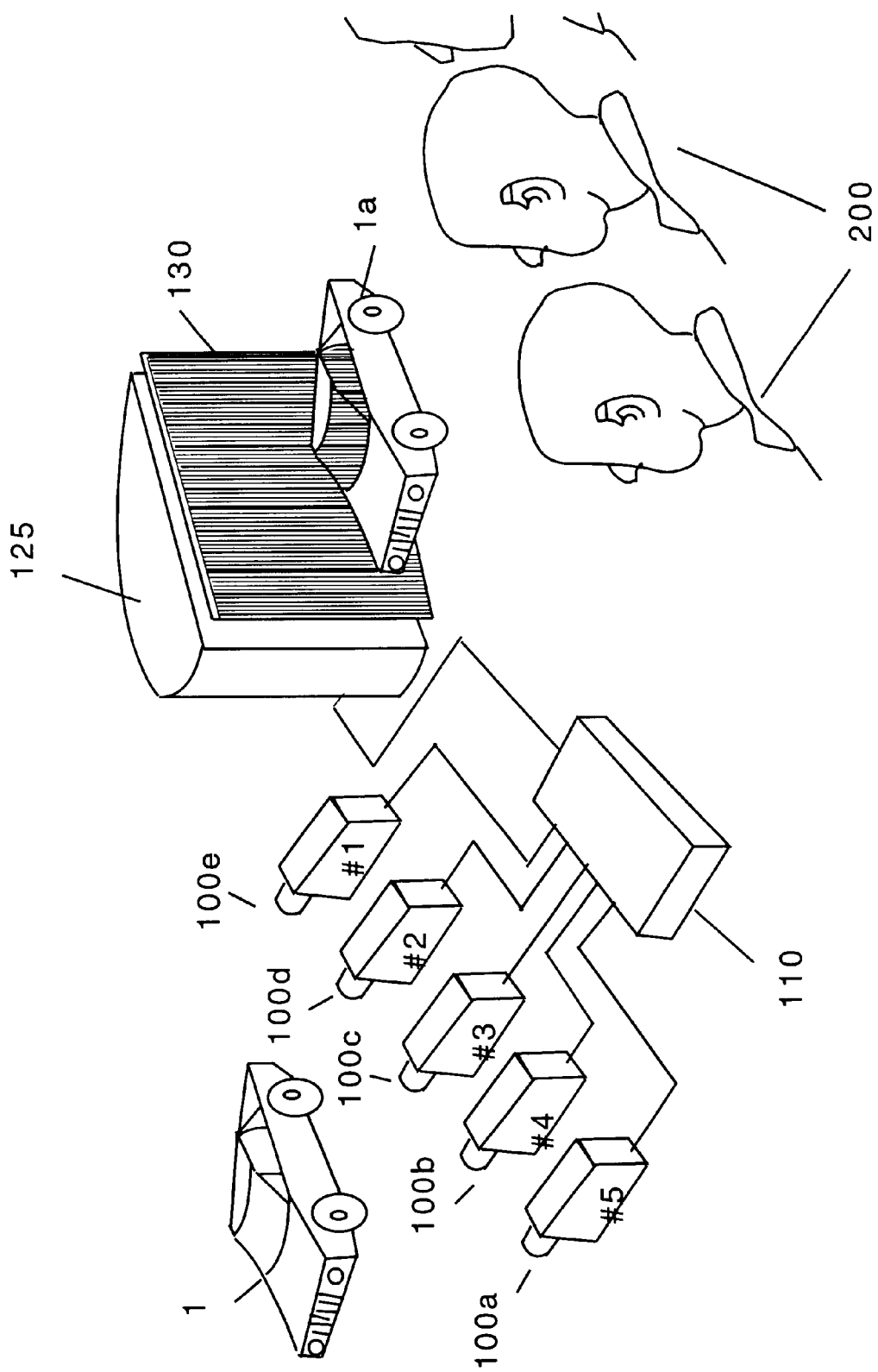
FIG. 7 is a drawing of the overall device, incorporating a five-viewpoint "Holographic" system, video circuitry, video display, and shutter screen.

This type of system is shown in FIGS. 7–10 and 12. FIG. 7 shows the overall system. Here an object 1 is captured by five cameras 100a, 100b, 100c, 100d and 100e. These cameras are fed into a video controller 110. The video controller 110 also has the timing circuits, like before. A display screen 125 is provided to display the five viewpoints. A masking screen 130 having shutters as before is placed in front of the screen. The masking screen has five sets of shutters. A person 200 is shown in various places in front of the two screens and is able to "see" an image 1a in three-dimensional form. Such a system could accommodate several viewers.

Figure 8:
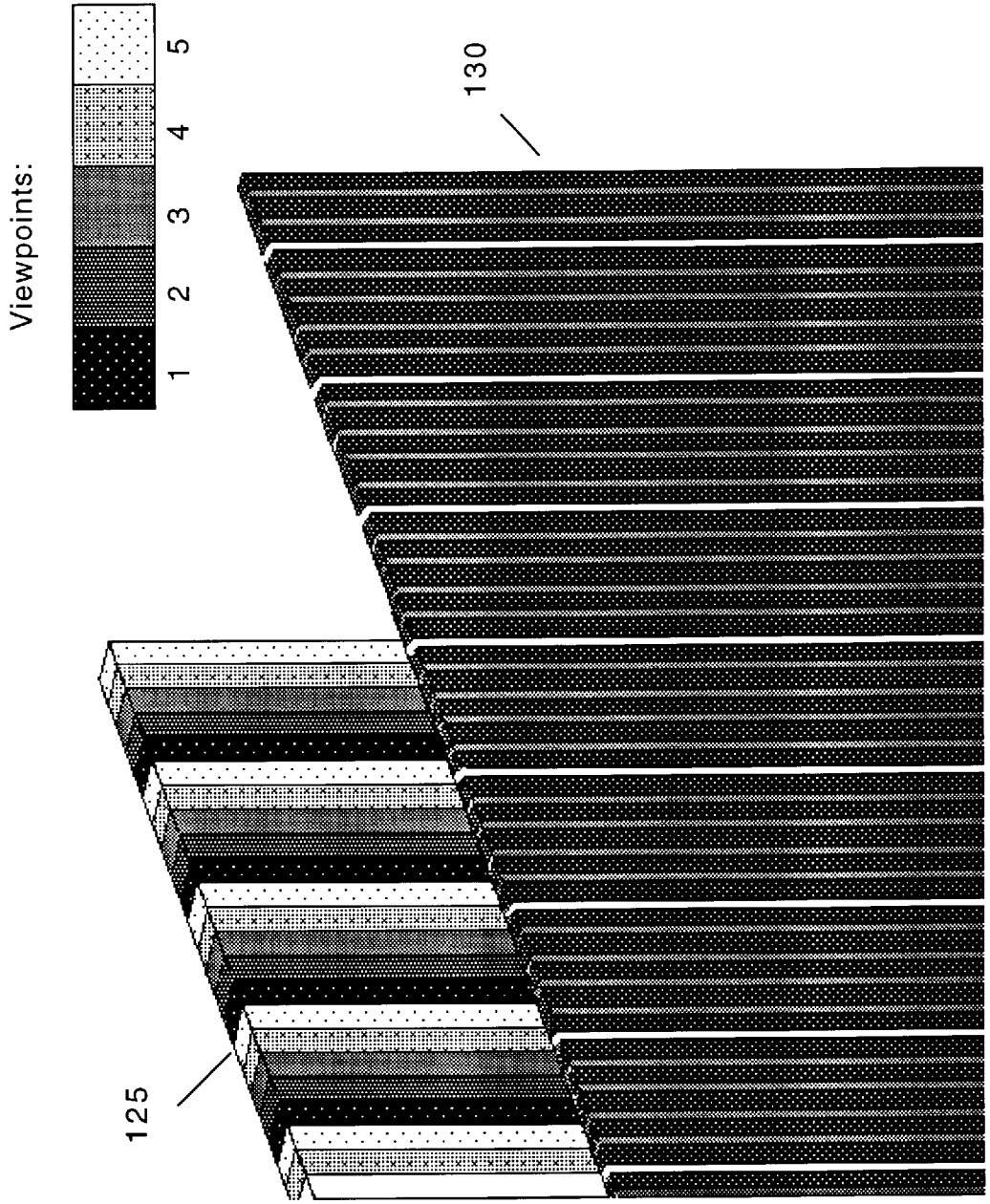
FIG. 8 is an expanded view of the display unit of FIG. 7, showing a five-viewpoint system, comprised of a video display, interlacing the five "Holographic" viewpoints, located behind and parallel to, a shutter screen comprised of a plurality of narrow, vertical shutters grouped into five subgroups—one subgroup of shutters "opened", while the remaining four subgroups are closed.

FIG. 8 shows the five viewpoints, and their arrangement as displayed as pixels. An enlarged view of the masking screen 130 is also shown.

Figure 9:
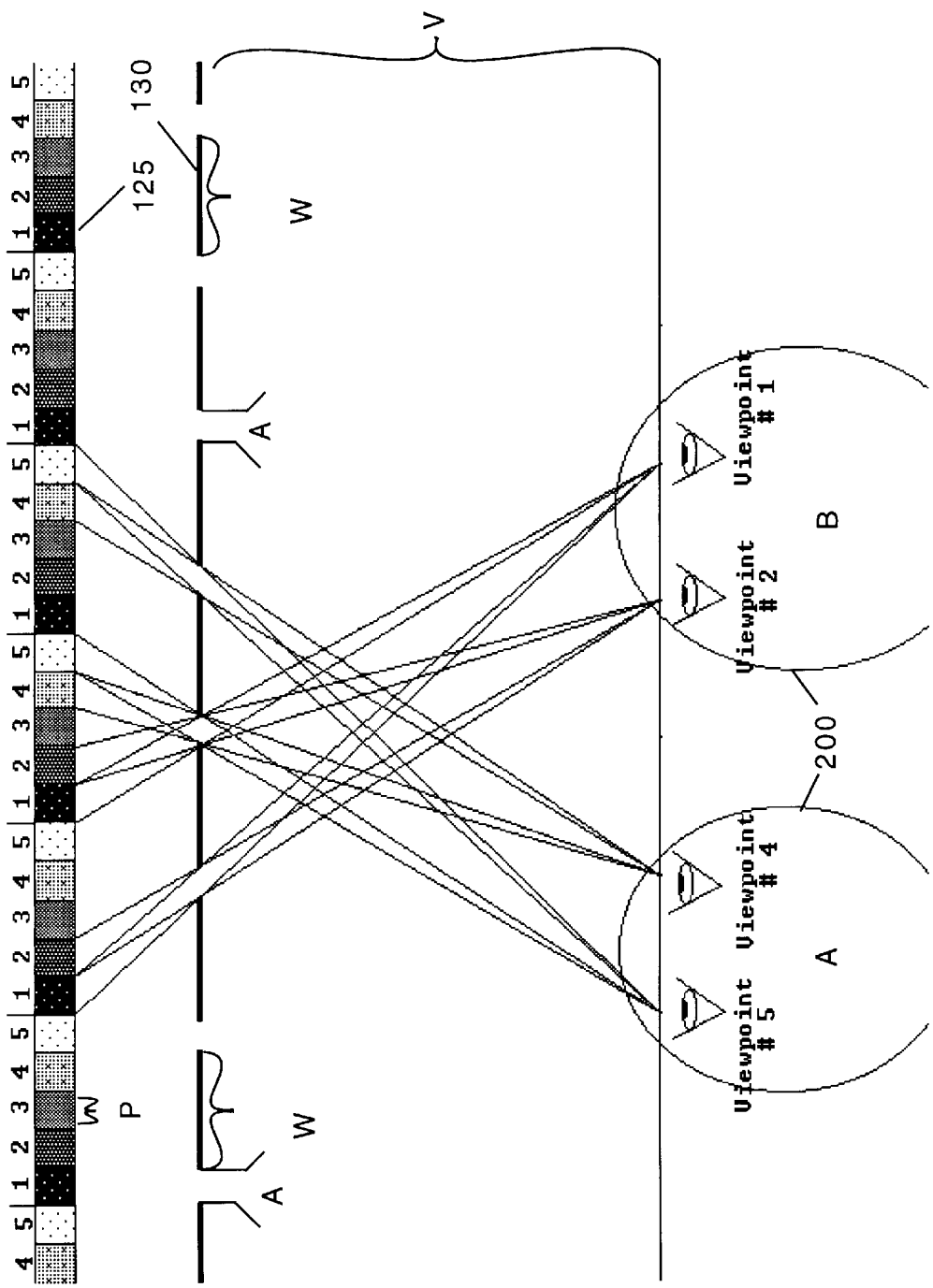
FIG. 9 illustrates the geometric and optical characteristics of the five-viewpoint "Holographic" system shown in FIG. 7, showing five interlaced viewpoints, and the geometric effect of lateral movement by the viewer.

FIG. 9 shows the positioning geometry for the five-image system. As is shown, viewer A can see only viewpoints 1 and 2 by looking at the screen from the position shown. Viewer B can see only viewpoints 4 and 5 in that position. So, as a viewer moves laterally, the eye sees a flow of viewpoints, which appears as movement along or around the image, much like a person looking at an actual three-dimensional object and looking around it by shifting his position with respect to the object.

Figure 10:
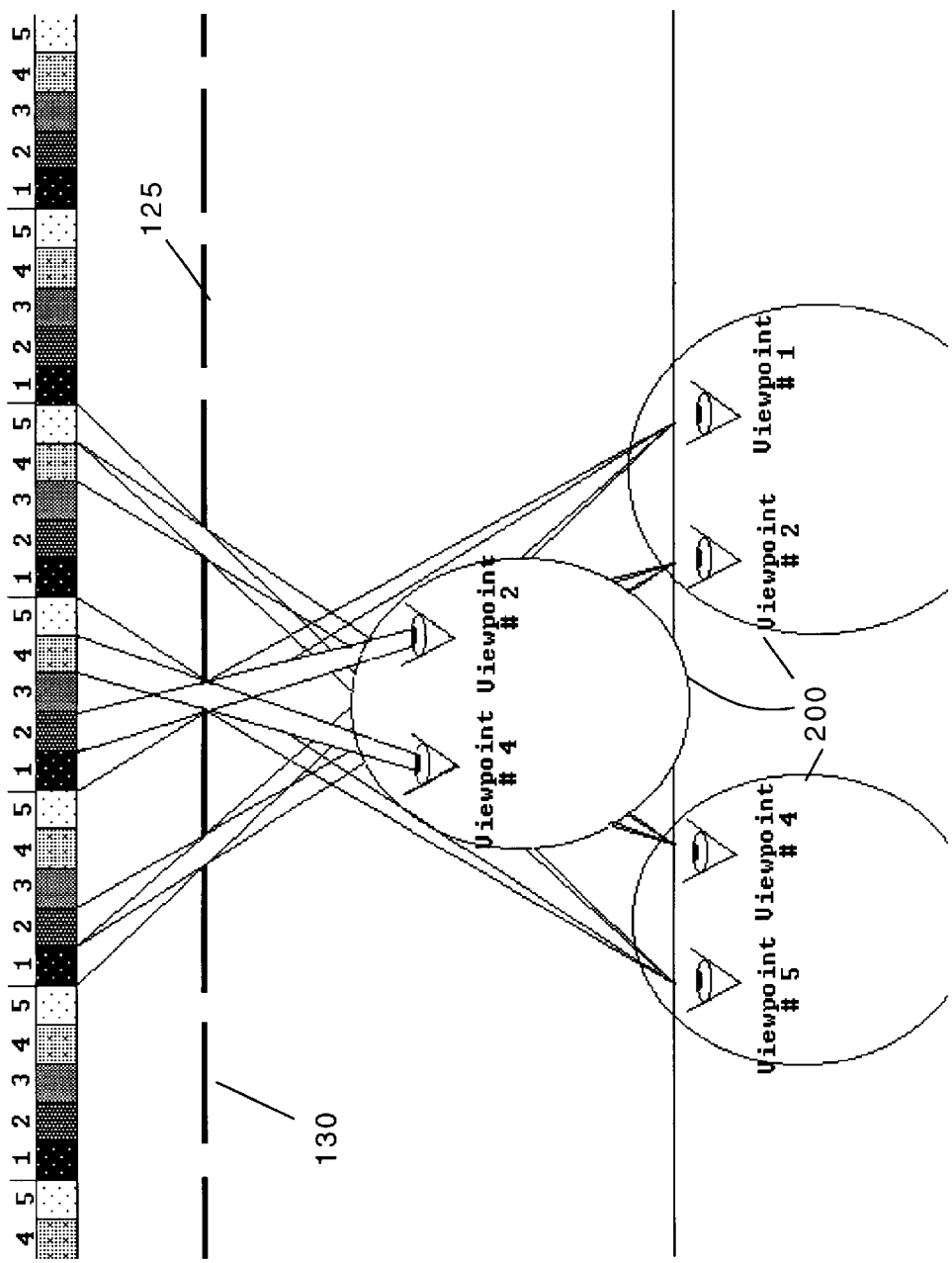
FIG. 10 illustrates the geometric and optical characteristics, as well as the enhanced freedom of movement of the Viewer of the "Holographic" system, showing the geometric effect of lateral movement (as shown in FIG. 9), as well as the geometric effect of the Viewer moving closer to the display unit.

Besides moving laterally, with a holographic display, a viewer can move closer to the screen and still maintain the holographic display. This is shown in FIG. 10. For example, if a viewer is properly positioned so that their right eye was located within viewpoint area #2 and the left eye was located within viewpoint area #3, a normal three-dimensional stereoscopic image is created. If the same viewer moves closer to the display, the right eye may still be located within viewpoint area #2, but the left eye then leaves viewpoint area #3, and crosses through the overlap area to enter viewpoint area #4. This causes the three-dimensional image to appear to move closer to the viewer. With both stereoscopic and holographic display systems, the viewers still must contend with the "overlap" area—the area between viewpoint areas where one eye of the viewer is able to see two viewpoints simultaneously, causing a possible loss of the three-dimensional stereoscopic effect.

Figure 11:
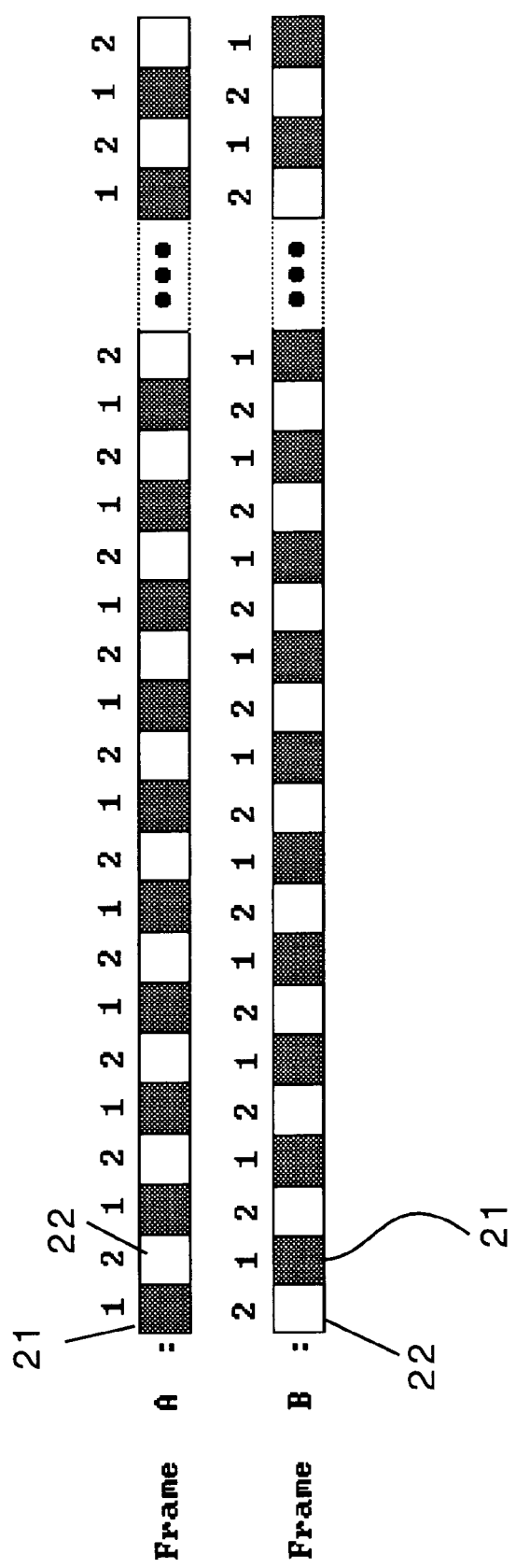
FIG. 11 shows one horizontal line of pixels from each of two complimentary frames, detailing the interlacing of vertical rows of pixels of the two complimentary frames—Frame 1 starting with a vertical row of pixels conveying the Right Eye viewpoint (Viewpoint #1), and Frame 2 starting with a vertical row of pixels conveying the Left Eye viewpoint (Viewpoint #2).
Figure 12:
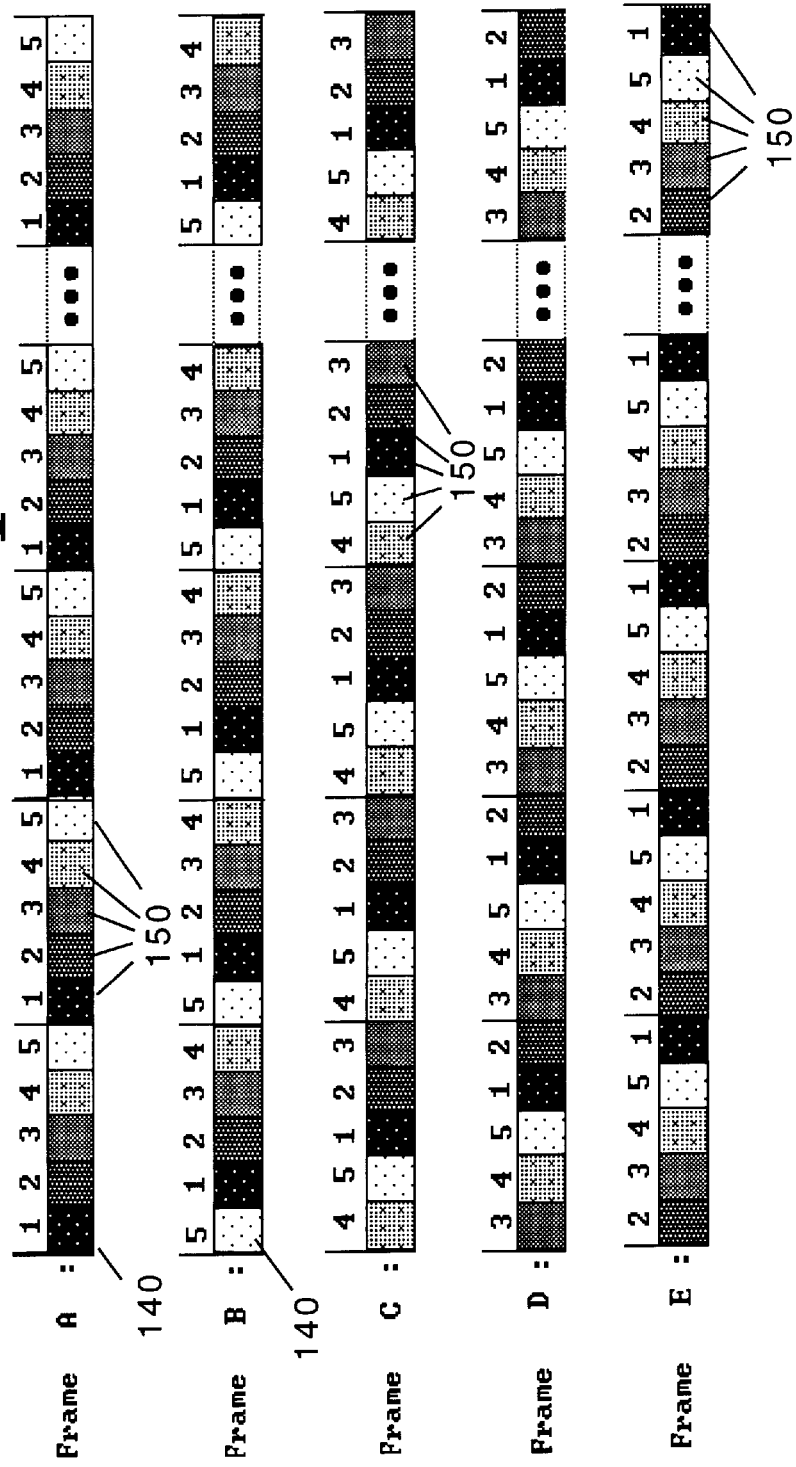
FIG. 12 shows one horizontal line of pixels from each of five complimentary frames, detailing the interlacing of vertical rows of pixels of the five complimentary frames, and how, after five complimentary frames are presented, the information necessary to display five different, complete, high resolution viewpoints are presented.

FIG. 12 shows the arrangement and flow of the pixels over five frames, as was done for the stereographic system in FIG. 11. Any series of patterns may be presented, with reduction in flicker being the main concern. As long as the necessary information for five viewpoints is presented in five frames. After five frames, the cycle is repeated.

A further enhancement to the system uses lenticules (tiny, plano-convex shaped lenses) as an enhancement to the apertures. These lenticules magnify the viewable area of the pixels to alleviate the need of a high horizontal fill-factor.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A system for displaying full-motion, full-spectrum, high resolution, three-dimensional stereoscopic images in front of a viewer comprising:

a) a display screen, having a flat viewing surface, and capable of displaying a series of complimentary interlaced frames, and wherein the display screen has a plurality of pixel display points P;

b) a flat masking screen, having a plurality of narrow, parallel, vertical apertures, said flat masking screen being positioned in front of, and in a spatial relation to, said display screen, said plurality of narrow, parallel, vertical apertures being grouped into a first sub-group and a second sub-group, wherein when said first sub-group of apertures is open, the second sub-group is closed, and further wherein said first and second sub-groups of narrow, parallel, vertical apertures being geometrically aligned with a viewer's eyes and the series of complimentary interlaced frames on said display screen;

c) wherein said viewer is positioned in front of the display screen and flat masking screen at a distance V from the flat masking screen, and wherein there exists a viewing area for a viewer's eyes, said viewing area being designated by D, and further wherein an overlap area, O is created wherein the display of said images viewpoints is not observable, and further wherein each of said plurality of apertures having an aperture width designated by the letter A, defining a width of the open portion of the first and second aperture sub-groups, and an opaque width designated by the letter W, defining a width of a closed portion of the first and second aperture sub-groups, and further wherein the flat masking screen is positioned in front of the display screen at a distance S, the parameters A, W and S, defined above, being derived from the following relationships:

$$A=(P*O)/(P+D+O) \quad (1)$$

$$W=(P*D)/(P+D+O) \quad (2)$$

$$S=(P*V)/(P+D+O); \quad (3)$$

d) a means for opening and closing said first and second sub-groups of narrow, parallel, vertical apertures, in operable communication with said first and second sub-groups of narrow, parallel, vertical apertures;

e) an image source;

f) a means for capturing said image source and defining said image source in at least two different points of view;

g) a means for interlacing said two different points of view into an interlaced frame; and h) a means for transmitting said interlaced frame to said display screen for viewing.

2. The system of claim 1 wherein said display screen has a frame rate, and wherein the frame rate is at twice a frame rate necessary to present a flickerless image.

3. The system of claim 1 wherein said first and second aperture sub-groups are interlaced among each other, such that apertures of the first sub group are adjacent to apertures from the second sub group.

4. The system of claim 1 wherein said first and second aperture sub-groups can be collectively opened if a stereoscopic effect is not desired.

5. The system of claim 1 wherein the flat masking screen comprises a plurality of liquid crystals.

6. The system of claim 1 wherein the means for capturing said image source and defining said image source in at least two different points of view comprise two video cameras.

7. The system of claim 1 wherein the means for capturing said image source and defining said image source in at least two different points of view comprise images generated by a computer.

8. The system of claim 1 wherein the means for capturing said image source and defining said image source in at least two different points of view comprise five video cameras.

9. A method for stereographic display of two separate viewpoints comprising the steps of:

a) capturing two separate viewpoint images;

b) horizontally dividing the two separate viewpoint images into vertical elements;

c) interlacing said vertical elements to create a first frame and a second frame, such that the first and second frames being complimentary to one another in that, while the first frame displays one-half of each of the two viewpoint images interlaced together, the second frame displays a remaining half of each of the two viewpoint images, whereby said first and second frames being interlaced together into a set of interlaced frames;

d) displaying the set of interlaced frames on a display screen having a flat viewing surface, and capable of displaying a series of complimentary interlaced frames, and wherein the display screen has a plurality of pixel display points P;

e) positioning a flat masking screen, having a plurality of narrow, parallel, vertical apertures, in front of, and in a spatial relation to, said display screen, said plurality of narrow, parallel, vertical apertures being grouped into a first sub-group and a second sub-group, wherein when said first sub-group of apertures is open, the second sub-group is closed, and further wherein said first and second sub-groups of narrow, parallel, vertical apertures being geometrically aligned with a viewer's eyes and the set of interlaced frames on said display screen and further wherein a viewer is positioned in front of the display screen and flat masking screen at a distance V from the flat masking screen, and wherein there exists a viewing area for a viewer's eyes, said viewing area being designated by D, and further wherein an overlap area, O is created wherein the display of said images viewpoints is not observable, and further wherein each of said plurality of apertures having an aperture width designated by the letter A, defining a width of the open portion of the first and second aperture sub-groups, and an opaque width designated by the letter W, defining a width of a closed portion of the first and second aperture sub-groups, and further wherein the flat masking screen is positioned in front of the display screen at a distance S, the parameters A, W and S, defined above, being derived from the following relationships:

$$A=(P*O)/(P+D+O) \quad (1)$$

$$W=(P*D)/(P+D+O) \quad (2)$$

$$S=(P*V)/(P+D+O) \quad (3)$$

and f) operating a means for controlling said vertical apertures so that for each frame sequence, one sub group of vertical apertures is opened, while the adjacent sub group of vertical apertures is closed.

10. The method of claim 9 wherein the step of capturing two separate viewpoint images utilizes two video cameras.

11. The method of claim 10 wherein the step of capturing two separate viewpoint images utilizes images generated by a computer.

12. The method of claim 9 wherein said first and second sub groups of apertures can be opened if the stereoscopic effect is not desired.

13. The method of claim 9 wherein the flat masking screen comprises a plurality of liquid crystals.

14. A method for holographic display of five separate viewpoints comprising the steps of:

a) capturing five separate viewpoint images;

b) horizontally dividing the five separate viewpoint images into vertical elements;

c) interlacing said vertical elements to create five successive frames, such that said successive frames being complimentary to one another in that, while the first frame displays one-fifth of each of the five viewpoint images interlaced together, the succeeding frames display the remaining fourth-fifths of each of the five viewpoint images appropriately interlaced together;

d) displaying the interlaced frames on a display screen;

e) positioning a flat masking screen, having a plurality of narrow, parallel, vertical apertures, in front of, and in a spatial relation to, said display screen, said plurality of narrow, parallel, vertical apertures being grouped into a first sub-group and a second sub-group, wherein when said first sub-group of apertures is open, the second sub-group is closed, and further wherein said first and second sub-groups of narrow, parallel, vertical apertures being geometrically aligned with a viewer's eyes and the series of complimentary interlaced frames on said display screen and further wherein a viewer is positioned in front of the display screen and flat masking screen at a distance V from the flat masking screen, and wherein there exists a viewing area for a viewer's eyes, said viewing area being designated by D, and further wherein an overlap area, O is created wherein the display of said images viewpoints is not observable, and further wherein each of said plurality of apertures having an aperture width designated by the letter A, defining a width of the open portion of the first and second aperture sub-groups, and an opaque width designated by the letter W, defining a width of a closed portion of the first and second aperture sub-groups, and further wherein the flat masking screen is positioned in front of the display screen at a distance S, the parameters A, W and S, defined above, being derived from the following relationships:

$$A=(P*O)/(P+D+O) \quad (1)$$

$$W=(P*D)/(P+D+O) \quad (2)$$

$$S=(P*V)/(P+D+O); \quad (3)$$

and f) operating a means for controlling said vertical apertures so that for each frame sequence, one sub group of vertical apertures is opened, while the adjacent sub group of vertical apertures is closed.

15. The method of claim 14 wherein the step of capturing five separate viewpoint images utilizes five video cameras.

16. The method of claim 14 wherein the step of capturing five separate viewpoint images utilizes images generated by a computer.

17. The method of claim 14 wherein the flat masking screen comprises a plurality of liquid crystals.

* * * * *